Sept. 26, 1933.　　　　G. J. NAMECHE　　　　1,928,026
APPARATUS FOR ROLLING PLATE GLASS
Filed Oct. 6, 1932　　　2 Sheets-Sheet 1
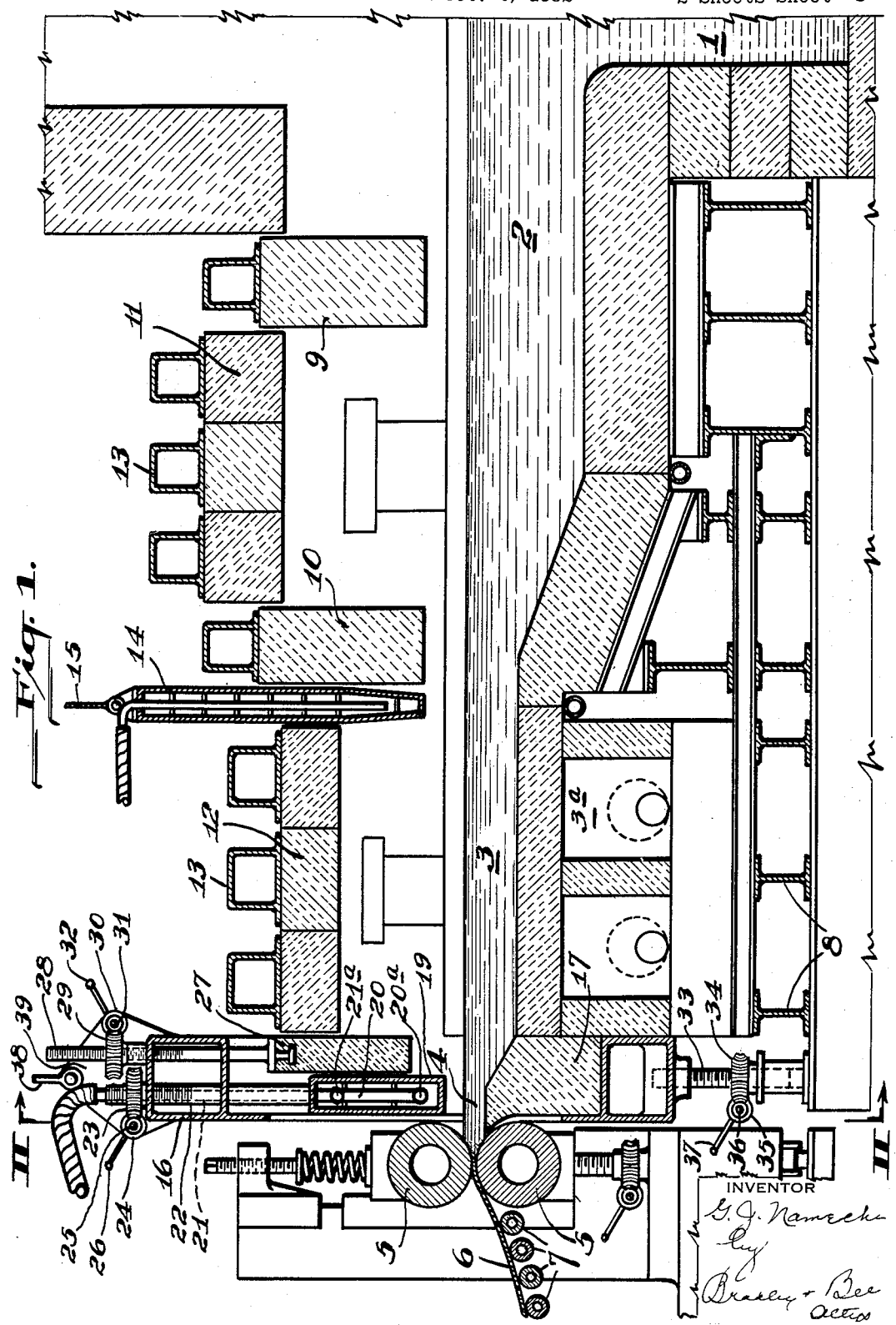

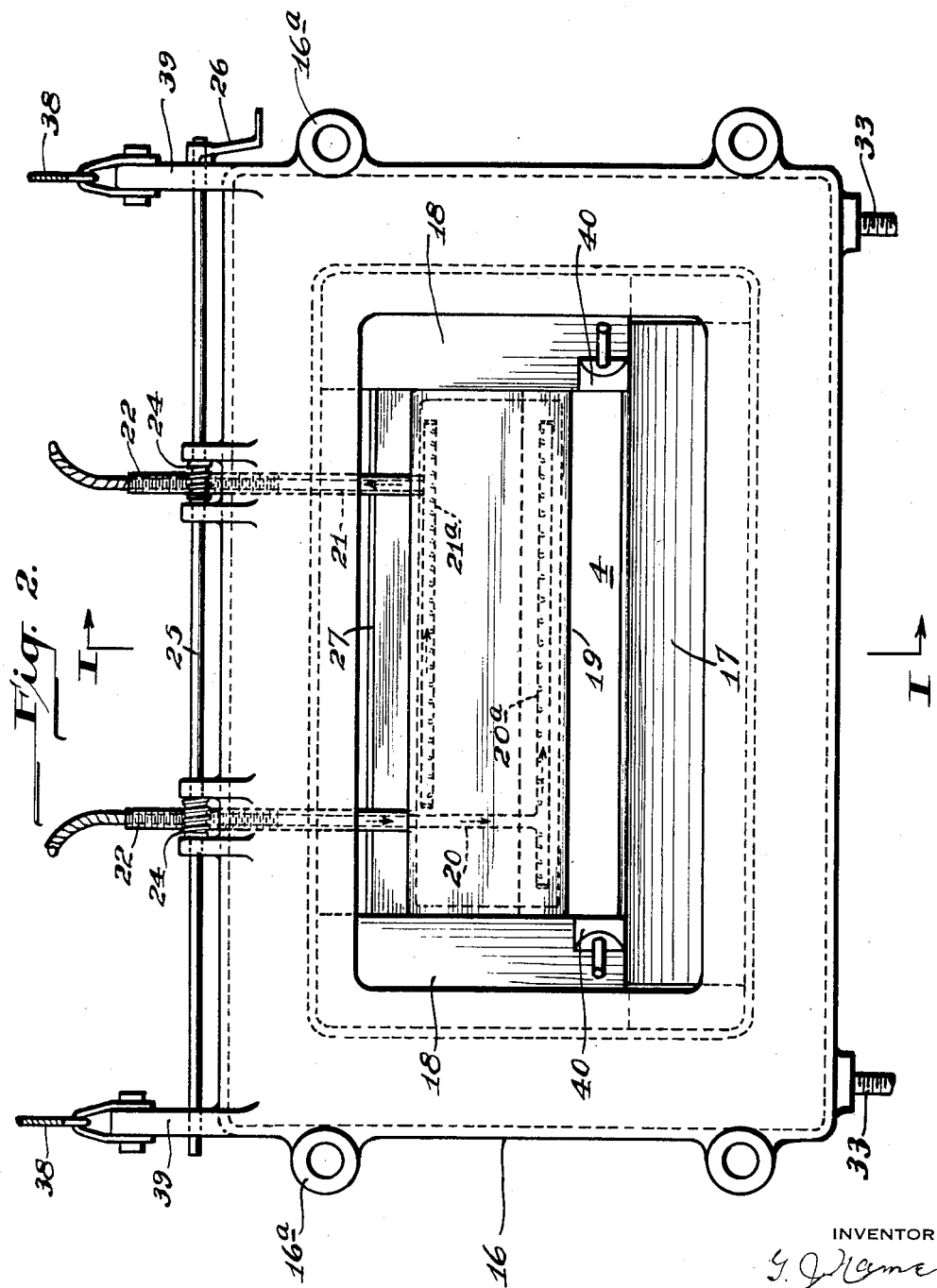

Patented Sept. 26, 1933

1,928,026

UNITED STATES PATENT OFFICE 1,928,026

APPARATUS FOR ROLLING PLATE GLASS

Gus J. Nameche, Ford City, Pa., assignor to Pittsburgh Plate Glass Company, a corporation of Pennsylvania Application October 6, 1932. Serial No. 636,505

8 Claims. (Cl. 49—33)

The invention relates to apparatus for rolling plate glass continuously from a tank, and has for its principal objects the provision of an improved construction back of the forming or sizing rolls for regulating the temperature of the glass and for cooling the upper forming roll. A further object is to promote the speed of rolling and improve the quality of the glass by reducing the amount of ream in the sheet produced. One embodiment of the invention is shown in the accompanying drawings, wherein:

Fig. 1 is a vertical section on the line I—I of Fig. 2. And Fig. 2 is a front elevation on the line II—II of Fig. 1.

Referring to the drawings, 1 is the front end of a glass melting tank preferably of the usual regenerative type; 2 is an extension of the melting tank; and 3 is a delivery pot with an outlet 4 at its forward end, from which the glass is delivered between a pair of water cooled rolls 5, 5 driven by any suitable means, not shown. The glass delivered between the rolls is formed into a ribbon 6 passing over the rolls 7 and through a roller leer, not shown. The extension 2 and delivery pot 3 are supported on a suitable underframing, including the I-beams 8. Underneath the delivery pot 3 is the usual kiln 3ª provided with suitable heating chambers and burners by means of which the delivery pot is maintained at a proper temperature.

The arch members 9 and 10 and the roof blocks 11 and 12 are preferably supported by the hollow water cooled members 13, 13, etc. In order to provide for the cutting off of the supply of glass from the extension 2 to the delivery pot 3, the water cooled gate or shear cake 14 is provided supported from above by means of chains 15 connected to an overhead crane whereby the gate may be raised and lowered when this operation is required.

At the front end of the delivery pot is a wall or closure, often referred to as a "slot member" made up of a suitable metal framework carrying clay blocks which constitute the body of the wall or member. As indicated in the drawings, the metal framework is in the form of a hollow casting 16 of rectangular shape. Supported on the bottom member of the framework 16 is a clay block 17, over which the glass flows in passing through the outlet 4. Seated upon the ends of the block 17 are the clay blocks 18, 18 (Fig. 2) constituting the side walls of the slot. Mounted above the slot and constituting the top wall thereof is the water cooled member 19. This member is hollow and is provided with a pair of pipes 20 and 21 extending through its top wall, by means of which a circulation of water is secured in order to keep the member at the desired temperature. The member is adjusted vertically by means of a pair of rods 22 which extend through the casting 16 and are threaded at their upper ends. The rods 22 are hollow and carry the water pipes 20 and 21, the pipe 20 being connected at its lower end to the perforated pipe 20a lying in the member 19, and the pipe 21 being connected to the perforated pipe 21a, also lying inside the member 19 (Fig. 2). Upon these threaded upper ends are mounted a pair of worm wheels 23 which are seated upon the casting 16 and are driven by worms 24 on the shaft 25, such shaft 25 having at its end a crank 26. By this means the member 19 may be raised and lowered to any desired position. The casing is secured to the end of the tank by means of the rods extending through the perforations in the lugs 16a (Fig. 2).

Back of the water cooled member 19 is a shade member 27 of refractory material, such as clay, also mounted for vertical adjustment so that the cooling effect of the member 19 on the bath of glass back of such member may be regulated, the shade member being lowered when it is desired to reduce the cooling effect of the member 19 upon the glass. The shade member is raised and lowered by means of a pair of rods 28 which also extend upward through the casting 16 and are threaded through worm wheels 29 seated upon the top of the casting. These worm wheels are rotated by means of a pair of worms 30 carried upon the shaft 31, such shaft being rotated by means of the crank 32.

In order to regulate the vertical position of the casting 16 and of the outlet slot 4, the casting is mounted upon a pair of screws 33 which are moved up and down by worm wheels 34, such worm wheels being operated by worms 35 carried by the shaft 36. The shaft 36 is rotated by means of the crank 37 at one end thereof. The metal framework and the parts carried thereby are arranged to be removed bodily when replacement or repair is necessary, this being accomplished by the chains 38 secured to lugs 39 on the casting and attached at their upper ends to an overhead crane which is not shown. The triangular spaces at the ends of the rolls 5, 5 are closed by the usual metal members 40 (Fig. 2), referred to in the art as "guns" and preferably heated by gas burners as is well known in the art.

The provision of the water cooled member 19 immediately back of the upper sizing roll 5 gives a means for cooling the upper roll 5 in addition to the internal cooling of such roll and for regulating the temperature of the glass as it flows through the slot 4. This permits of a somewhat higher rolling speed and tends to reduce the ream since the drop in temperature of the glass is not so sharp when it strikes the rolls as would be the case if such glass were not reduced in temperature by the cooling member. The use of the shade stone 27 permits of a regulation of the cooling effect of the member 19 upon the glass in the delivery pot. If desired the water cooled member 19 may be used as a cut-off gate to stop the flow of glass to the sizing rolls should this become necessary. The cooling member also increases the viscosity of the glass flowing through the outlet 4 so that practically all the glass flowing over the clay lip passes into the sheet and the amount of excess or push back glass is reduced to a minimum. This is a desirable condition as the quality of the glass is improved in comparison with other arrangements where this condition cannot be produced.

What I claim is:

1. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, and a hollow water cooled member mounted for vertical movement in the framework and constituting the upper wall of the outlet slot.

2. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, a hollow water cooled member mounted for vertical movement in the framework and constituting the upper wall of the slot member, and a shade member of refractory material back of the water cooled member and also mounted for vertical movement in the framework.

3. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, a hollow water cooled member mounted for vertical movement in the framework and constituting the upper wall of the outlet slot, and means for adjusting the framework vertically.

4. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, a hollow water cooled member mounted for vertical movement in the framework and constituting the upper wall of the slot member, means for adjusting the framework vertically, and a shade member of refractory material back of the water cooled member and also mounted for vertical movement in the framework.

5. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, and a hollow water cooled member mounted for vertical movement in the framework just to the rear of the upper of said rolls, and in vertical alignment with the bottom wall of the slot, and constituting the upper wall of the outlet slot.

6. The combination with a tank adapted to carry a bath of molten glass, and a pair of sizing rolls at one end thereof for forming a sheet or ribbon of glass, of closure means for the end of the tank back of the rolls comprising a framework of metal provided with clay members forming the bottom and side walls of an outlet slot opposite the pass between the sizing rolls, and a hollow water cooled gate member constituting the upper wall of the slot mounted for vertical movement in the framework and adapted in its lowermost position to cut off the flow of glass through the slot.

7. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, a hollow water cooled member mounted for vertical movement in the framework and constituting the upper wall of the outlet slot, and means carried by the framework for adjusting the water cooled member vertically.

8. The combination with a tank adapted to carry a bath of molten glass, and a pair of sizing rolls at one end thereof for forming a sheet or ribbon of glass, of a slot member between the bath and rolls comprising a refractory wall constituting the bottom and side walls of the outlet slot, a metal framework supporting the refractory wall, a hollow water cooled member mounted for vertical movement in the framework and constituting the upper wall of the slot member, a shade member of refractory material back of the water cooled member and also mounted for vertical movement in the framework, and means carried by the framework for adjusting the water cooled member and the shade member vertically.

GUS J. NAMECHE.